C. W. BAKER.
TRANSPORTATION SYSTEM FOR LIGHT TRAFFIC LINES.
APPLICATION FILED JULY 3, 1915.
1,199,752. Patented Oct. 3, 1916.
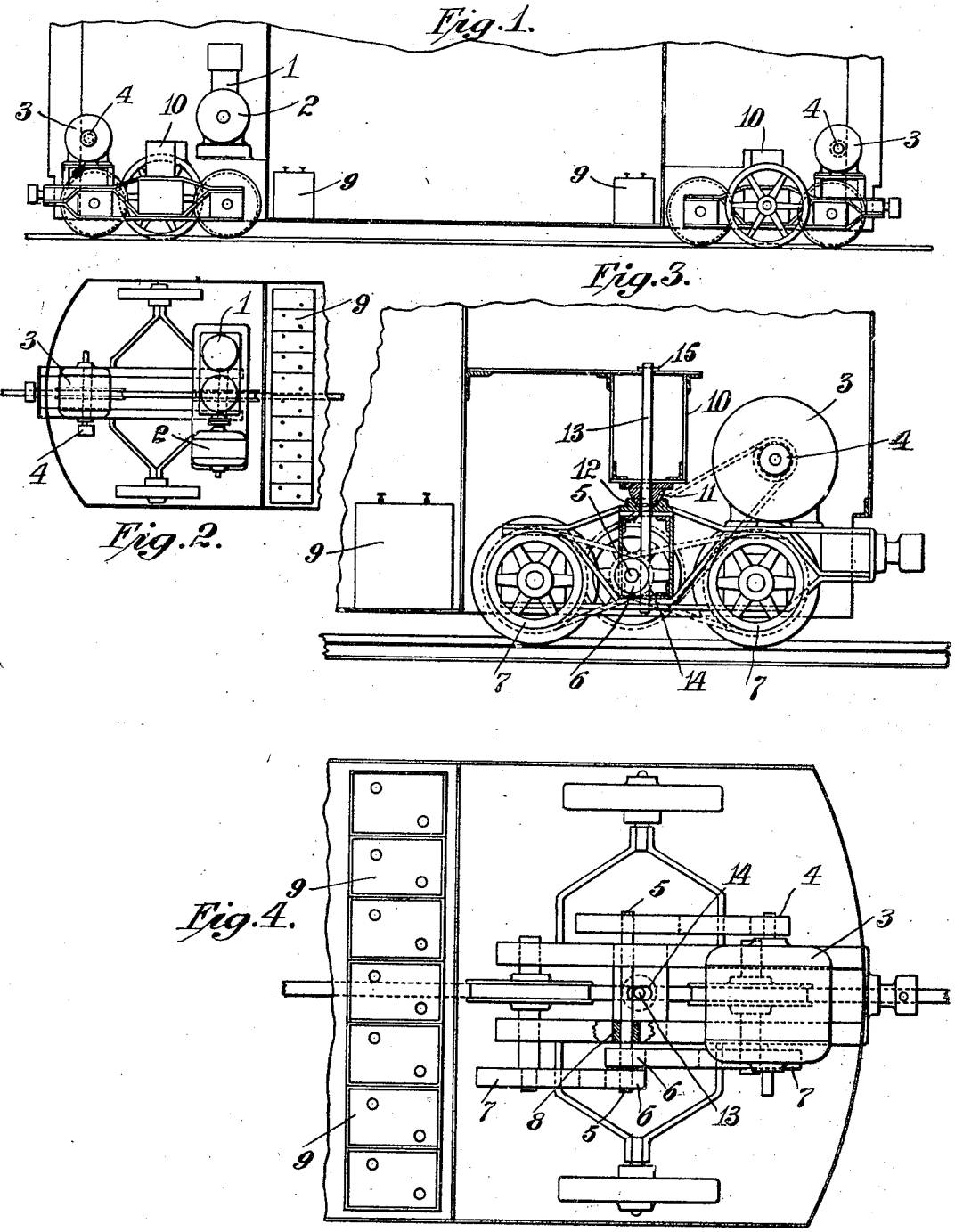

UNITED STATES PATENT OFFICE.

CHARLES WHITING BAKER, OF MONTCLAIR, NEW JERSEY.

TRANSPORTATION SYSTEM FOR LIGHT-TRAFFIC LINES.

1,199,752.   Specification of Letters Patent.   Patented Oct. 3, 1916.

Application filed July 3, 1915. Serial No. 38,035.

*To all whom it may concern:*

Be it known that I, CHARLES WHITING BAKER, a citizen of the United States, residing at Montclair, in the county of Essex and State of New Jersey, have invented certain new and useful Improvements in Transportation Systems for Light-Traffic Lines, of which the following is a specification.

My invention consists of certain improvements on the system of transportation patented by me August 9, 1904, (Patent No. 766,802) in which a car with a very low center of gravity was balanced over a single rail by balancing wheels at each side which run upon the paved roadway, and the car was propelled by pairs of driving wheels in a horizontal plane gripping the head of the central rail.

My present invention relates to the application of motive power to such a car without the use of the gripping driving wheels, thereby enabling the head of the rail to be made flush with the surface of the roadway, so that it does not interfere with the use of the roadway by other vehicles. The motive power is further applied in such a manner that the balancing of the car is not interfered with, and the entire weight of the car is available for traction, while other advantages are secured as hereinafter explained.

My invention is illustrated in the accompanying drawing in which—

Figure 1 is a diagrammatic part side elevation of a monorail car; Fig. 2 is a part plan of the same; Fig. 3 is a sectional elevation of one end of the car; and Fig. 4 is a plan of the same.

Referring to Fig. 1, at any convenient location on the car body, but preferably at one end so as not to interfere with the use of the central portion of the car for passengers or freight, is placed a gasolene or oil engine 1, with an electric generator 2 directly connected to it. The current generated is transmitted to electric motors 3, 3, one placed on top of each truck frame. Each motor drives a sprocket wheel 4, which is connected by a sprocket chain to a sprocket wheel on an intermediate shaft 5. This shaft 5 extends through the truck frame to the opposite side and has on its opposite end two small sprocket wheels 6, 6, which drive by chains larger sprockets 7, 7, on the front and rear axles of the truck. It will be seen that by this arrangement, the side strain on the bearing 8 of intermediate shaft 5 is eliminated, as the pull on the chains driving the front and rear wheels of the truck respectively, is balanced, and that end of the intermediate shaft 5 is subjected to torsion only. This equipment also makes it possible with only two motors to drive all four axles of the car. By this double reduction transmission it becomes possible to use a comparatively small high speed motor to drive the car, although the speed of the car itself is low, as is generally desirable on such monorail light traffic lines. The motor 3 will generally project beyond the truck frame, but the excess weight on one side may be balanced by placing the motor on the other truck so that it will project on the opposite side. A further advantage of this construction is that the motor and the entire transmission is spring supported. The truck frame is preferably constructed with springs over the journal boxes, and the motion of the front and rear axles up and down in their housings can take place freely as the sprocket chain transmission to these axles is approximately in a horizontal line. By this electric transmision, moreover, the driving of both the front and rear trucks of the car from one source of power is rendered easy, while it would be very difficult to mechanically transmit power between the trucks on account of the low-hung car body.

I prefer to mount the motor 3 so that it can be slid fore and aft on the truck frame, and thus any wear of the transmission chain from the motor shaft 3 to intermediate shaft 5 can be readily taken up.

The motors 3, 3 which propel the car, it will be obvious can be controlled by the usual type of controller placed at each end of the car, and with the usual appurtenances in the way of switches, rheostats, protecting fuses, etc. It is also obvious that a storage battery 9 may also be placed on the car, and if of small size may be used merely for starting the gasolene engine, the generator being arranged to act as a motor for starting, or if of larger size it may perform this function and in addition aid the generator to furnish current for starting or in climbing grades, being arranged to float in the line and be charged when the generator is underloaded.

I have shown in the accompanying drawings also an improved means of connecting the car body and the trucks, whereby the trucks will turn freely under the car body with a minimum of friction in rounding a curve, and, at the same time, the car body is kept steady, tipping only when the truck-frames, which support it tip, as in rounding a curve on which the roadway is given super-elevation, or from the motion of the balancing wheel axles and the springs.

Referring to Fig. 1, the weight of the car's load is carried by the side frames of the car acting as girders. These girders carry their load to a transverse frame or bolster 10 which is carried at the center by the convex body center plate 11 resting in a concave truck center plate 12. When the car is in a tipped position on a sharp curve, each truck will be turned at an angle to the car body, but the body center plate will perfectly adjust itself to the truck center plate since they make a ball-and-socket connection with each other.

To keep the car body upright on the truck frame, the long center pin 13 is inserted, passing down through the transverse frame 10, the body center plate 11 and truck center plate 12, and its lower end entering a slot on the piece 14 fastened to the lower part of the truck frame. The hole through the truck center plate 12, through which the pin 13 passes, is made slightly conical, and this, with the slot in piece 14, permits the truck to oscillate fore and aft with reference to the car body in passing over vertical curves. The cotter pin 15 in the top of the center pin 13 prevents it from dropping through, and the pin 13 can readily be withdrawn when it is desired to lift the body off the truck.

What I claim and desire to secure by Letters Patent of the United States is:—

1. In a monorail car having a body mounted on trucks, said trucks having double-flanged wheels running on the rail and balancing wheels at each side running on the roadway to maintain the truck frame upright, means for keeping the body of said car upright on said truck frame, said means comprising a body center-plate transmitting the weight of said body to a truck center-plate, and a removable long center-pin passing through said center-plates and restrained from lateral motion by bearings in the body bolster and in the truck frame.

2. In a monorail car having a body mounted on trucks, said trucks having double-flanged wheels running on the rail and balancing wheels at each side running on the roadway to maintain the truck frame upright, means for keeping the body of said car upright on said truck frame, said means comprising a convex body center-plate transmitting the load to a concave truck center-plate, the two center-plates forming a ball-and-socket joint with each other, and a removable long center-pin passing through said center-plates and restrained from lateral motion by bearings in the body bolster and in the truck frame.

3. In a monorail car balanced over a central rail and having a body mounted on trucks, the combination with balancing wheels at each side running on the roadway and maintaining the car in an upright position, of an engine and electric generator mounted on said car body with its weight equally distributed on either side of the car's longitudnal axis, and an electric motor mounted on each truck of said car, the overhang of one motor balancing the overhang of the other on the opposite side.

In testimony whereof I have hereunto signed my name in the presence of two subscribing witnesses.

CHARLES WHITING BAKER.

Witnesses:
M. E. McNINCH,
CHARLES S. JONES.